United States Patent [19]

Kendrick et al.

[11] 4,032,742

[45] June 28, 1977

[54] STUD WELDING GUN AND METHOD OF OPERATION

[75] Inventors: Gary R. Kendrick; Robert A. Sauder, both of Emporia, Kans.

[73] Assignee: Sauder Industries, Inc., Emporia, Kans.

[22] Filed: Sept. 24, 1975

[21] Appl. No.: 616,187

Related U.S. Application Data

[63] Continuation-in-part of Ser. No. 484,624, July 1, 1974, abandoned.

[52] U.S. Cl. .................................... 219/99; 219/98
[51] Int. Cl.² ........................................ B23K 9/20
[58] Field of Search ............... 81/52.4 R, 53; 174/153 R; 219/97, 98, 99, 101, 104, 78

[56] References Cited

UNITED STATES PATENTS

| | | | |
|---|---|---|---|
| 2,442,448 | 6/1948 | Zimmerman | 219/78 |
| 2,542,144 | 2/1951 | Kearns | 174/153 R X |
| 2,580,398 | 1/1952 | Braswell | 219/98 X |
| 2,644,068 | 6/1953 | Graham | 219/98 |
| 2,820,382 | 1/1958 | Smith | 81/52.4 R X |
| 2,900,856 | 8/1959 | Maier | 81/52.4 R X |
| 3,487,733 | 1/1970 | Townsend | 81/53 |
| 3,497,661 | 2/1970 | Comstock | 219/98 X |
| 3,706,870 | 12/1972 | Sauder et al. | 219/99 X |

*Primary Examiner*—J. V. Truhe
*Assistant Examiner*—N. D. Herkamp
*Attorney, Agent, or Firm*—Arnold, White & Durkee

[57] ABSTRACT

A welding terminal operable to arc weld to a work piece a stud thereafter drive an element prethreaded to the stud. In one embodiment, the welding terminal may be adapted to cooperate with a guide to facilitate engagement with the prethreaded element, and in another embodiment, the welding terminal may have fluting or ribs to grippingly engage a portion of the prethreaded element. The duration of the arc weld and the sequencing of the welding and driving functions both may be automatically controlled. The normal force imposed on the fixed stud portion and the torque imposed on the movable threaded portion may be substantially automatically limited.

28 Claims, 16 Drawing Figures

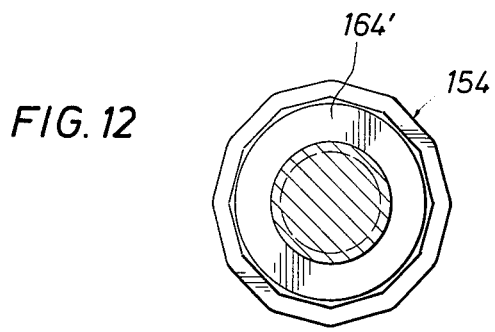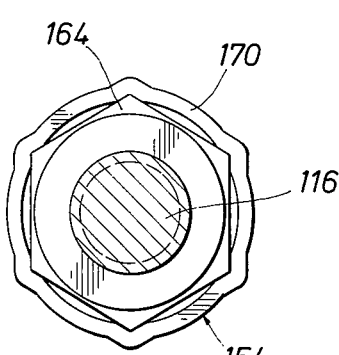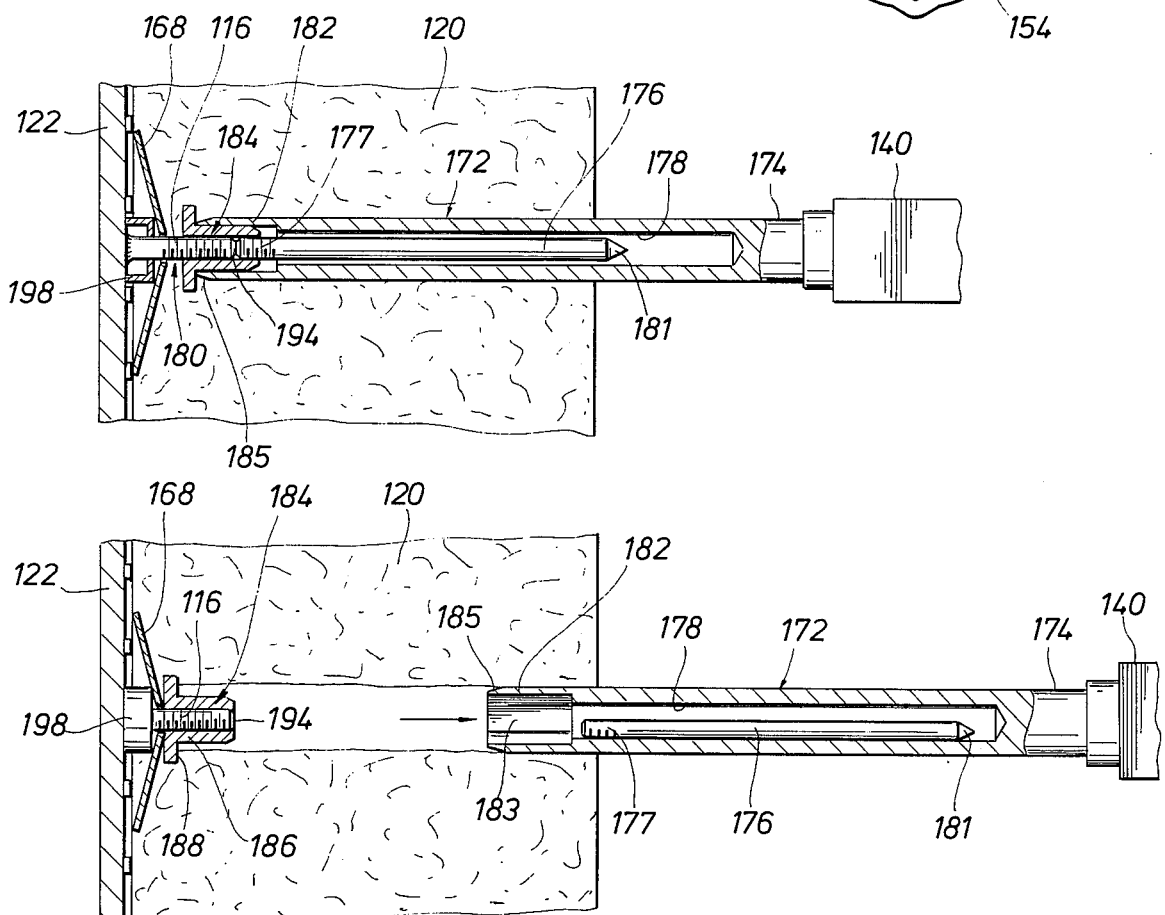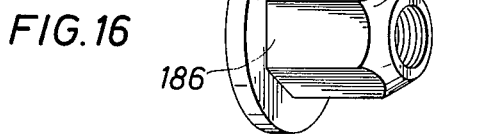

STUD WELDING GUN AND METHOD OF OPERATION

RELATED APPLICATIONS

The present application is a continuation-in-part of application Ser. No. 484,624 filed July 1, 1974 abandoned.

BACKGROUND OF THE INVENTION

The present invention relates to a method and apparatus for attaching a stud assembly to a relatively stationary object. More particularly, the invention relates to a method and apparatus for welding a stud to the stationary object and thereafter automatically advancing a prethreaded movable portion of the assembly to a final position.

Conventional stud welding is an extremely efficient and versatile fastening method. This technique has proven to be extremely beneficial in the metal working, transportation, and construction industries.

Stud welding is a process which is applicable to mild steel, stainless steel and aluminum. In the conventional process, an electric arc weld is utilized to bond the stud to the work piece. An electric arc is produced between the stud and the electrically conductive work piece and is maintained for a predetermined period. The heat produced by the electric arc forms a molten pool at the juncture of the stud and the work piece which, when permitted to cool, may be stronger than the stud itself.

It will be appreciated that the stud welding technique has an extremely broad spectrum of utility. For example, the technique is extensively utilized in the automotive, ship building, and building construction industries. The technique also finds utility in the furnace insulation industry.

A significant number of industrial furnaces operate at temperatures in excess of 2,500° F. and over long periods of time. In order in prevent inefficient and expensive heat losses from such furnaces and to facilitate the protection of personnel in the vicinity of such furnaces, the furnace is lined with insulation. In the case of fiber insulation, rectangular blankets of insulating material may be attached to the interior of the furnace by means of a welded stud to which is fastened a member for holding the fiber insulation against the furnace wall.

In the past, fiber insulation has been used by Sauder Industries, Incorporated, Emporia, Kansas, to insulate high temperature furnaces. This insulation was attached by first welding a stud network to a wall of the furnace. Fiber blankets would then be impaled on the stud network in a manner to minimize undersirable compression in the fiber blanket and gaps at the joints between the blankets.

Many conventional procedures and apparatus for attaching blanket-type fiber insulation to the walls of a furnace may require uneconomical furnace downtime. In addition, extensive manpower may be required to first lay out the stud network, impale the insulating material over this network, and then affix the insulating blanket to the stud. Moreover, undesirable compression and gaps may occur in this procedure.

There is presently available in the industry a PYROBLOC brand insulation module into which there has been embedded a stud assembly. This stud assembly is comprised of a stud having an arc shield disposed at one end with a nut threaded onto the stud at the other end. Typically, a washer lies intermediate the arc shield and the nut and a tubular sleeve is interference fit over the nut. This stud assembly is operably disposed in such a manner as to firmly secure the insulation module to a wall of a furnace. When the stud portion of the stud assembly has been welded to the furnace wall, and the sleeve has been rotated to thread the nut against the washer, the arrangement serves to secure the module to the furnace wall.

Whereas the method and apparatus of the present invention may have a large variety of applications, it will be seen that a particularly useful application of the present invention is the affixing of PYRO-BLOC brand insulation material to the walls of a furnace in an improved and significantly more economical manner over prior art techniques and apparatus.

OBJECTS AND SUMMARY OF PREFERRED EMBODIMENT OF THE INVENTION

It is therefore a general object of the present invention to provide a novel method and apparatus for attaching to a relatively stationary object a stud assembly having a relatively fixed portion and a movable portion movable between a first position and a second position, which method and apparatus substantially eliminate the problems of the type previously noted in the prior art.

It is a more particular object of the present invention to provide a novel method and apparatus for attaching to a relatively stationary object a stud assembly having a relatively fixed stud portion and a movable portion threaded thereto and movable between a first position and a second position, which, in a single manual operation, provides a welding of the stud portion of the stud assembly and a tightening of the movable threaded portion of the stud assembly.

It is another object of the present invention to provide a novel method and apparatus for attaching to a relatively stationary object a stud assembly having a relatively fixed portion and a movable portion movable between a first position and a second position, which method and apparatus utilize a single engagement head both as an arc welding terminal and as a displacement or drive mechanism.

It is still another object of the present invention to provide a novel method and apparatus for attaching to a relatively stationary object a stud assembly having a relatively fixed portion and a movable portion movable between a first position and a second position, which method and apparatus provide for the automatic welding of the fixed portion of the stud assembly and displacement of the movable portion of the stud assembly in a single manual operation.

It is yet still another object of the present invention to provide a novel method and apparatus for attaching to a relatively stationary object a stud assembly having a relatively fixed stud portion and a movable portion threaded thereto and movable between a first position and a second position, which guides a welding terminal through a zone of fibrous material to effect engagement of the welding terminal with a stud assembly, a portion of which is first welded by the welding terminal and a second portion of which is rotated by the welding terminal.

By way of summary, the apparatus of the present invention in preferred form comprises an arc welding generator having a terminal for conducting an electric current through a stud assembly, comprising a stud portion and a threaded member for arc welding the stud of the stud assembly to a stationary object such as a furnace wall. The terminal of the arc welding generator is operable to rotate the threaded member of the stud assembly after the weld has been completed. The force imposed on the stud assembly by the apparatus may be controlled by a spring or other biasing means positioned behind the terminal. The terminal may engage the stud assembly in a manner to provide a frictional coupling to drive the threaded member and provide torque control. Alternatively, the welding terminal may be cooperable with a guide member on the stud assembly in order to facilitate coupling of the apparatus of the invention to the stud assembly, say, embedded in a fibrous material. A control circuit provides timed sequential operation of the arc welding generator and displacement apparatus.

Other objects and advantages of the present invention will become apparent with reference to the following Figures, wherein like numerals indicate like elements, and detailed description wherein:

BRIEF DESCRIPTION OF THE DRAWINGS

FIG. 12 is a transverse-sectional view taken through section lines 12—12 in FIG. 9;

FIG. 13 is an alternative arrangement to that shown in FIG. 12;

FIG. 14 is a partial longitudinal-sectional view of an alternative driving head and arc welding terminal according to the present invention which is cooperable with a guide member comprising a stud assembly;

FIG. 15 is a partial longitudinal-sectional view of the driving head and arc welding terminal of FIG. 14 wherein the welding and driving functions have been completed and the head is withdrawn to carry away the guide member of the stud assembly; and FIG. 16 pictorially depicts a threaded member of the stud assembly of FIGS. 14 and 15.

DETAILED DESCRIPTION OF A PREFERRED EMBODIMENT OF THE INVENTION

Figure 1:
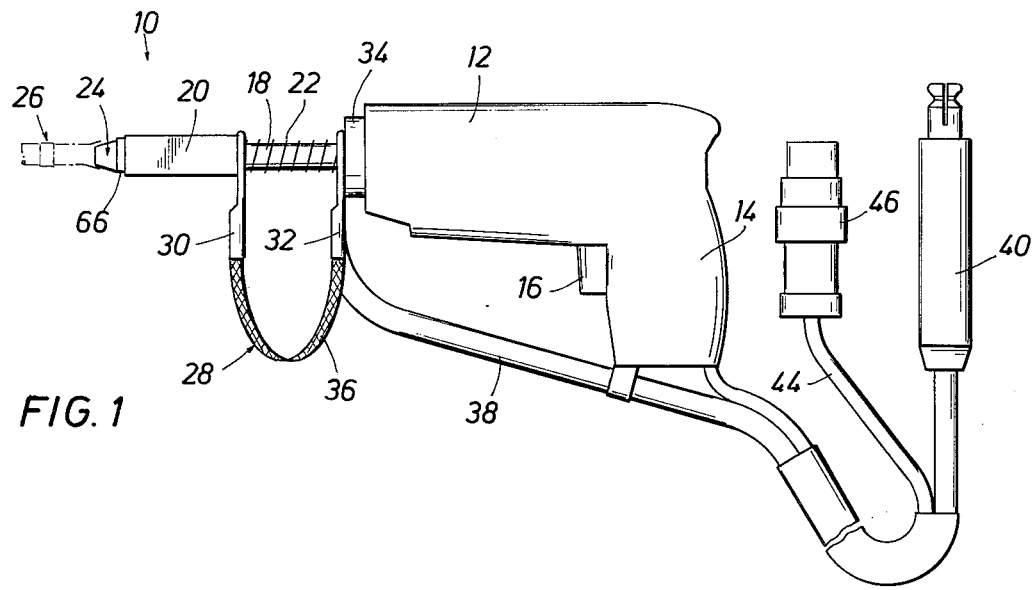
FIG. 1 pictorially depicts apparatus of the present invention.

As may be seen in FIG. 1, a fastening apparatus 10 according to the present invention is depicted. A housing 12 is provided having a pistol grip type handle 14 and a trigger switch 16. Extending from the housing 12 is a chuck 18 which is operable to support a sleeve or collar 20. The collar 20 is longitudinally movably mounted on the chuck 18 and is biased in a direction generally away from the housing 12 by means of a spring 22. The collar 20 carries a tapered electric terminal or engagement head 24 shown engaged with a stud assembly 26 (in phantom).

The engagement head 24 and collar 20 are both fabricated from an electrically conductive material, e.g., metal or stainless steel. Electric current may be supplied to the engagement or drive head 24 by means of a flexible current transfer cable 28. This flexible cable 28 is comprised of a first lug 30 in electrical and mechanical contact with the collar 20 and a second lug 32 which rests against an insulated portion 34 of the housing 12. The spring 22 is interposed between the lugs 30 and 32, and, as will be more fully described below, the spring 22 urges the first lug 30 against a proximal end 31 of the collar 20 and the second lug 32 against the insulated portion 34 of the housing 12. The first and second lugs are connected through a braided cable 36 of conventional design. Electric current is supplied to the second lug 32 through a welding cable 38 which is terminated at a welding generator electrical connector 40.

Hence, it will be appreciated that when electric current is supplied to the welding cable 38 from a conventional arc welding generator (not shown), the current travels through the flexible conductor 28 and collar 20 to the drive head 24.

Figure 2:
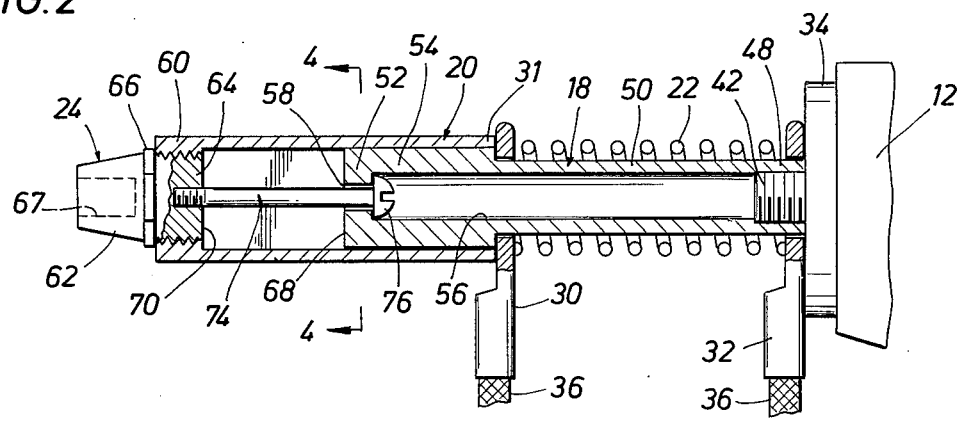
FIG. 2 is a partial longitudinal-sectional view of a driving head and arc welding terminal shown in FIG. 1 in a mode prior to engagement with a stud assembly.
Figure 3:
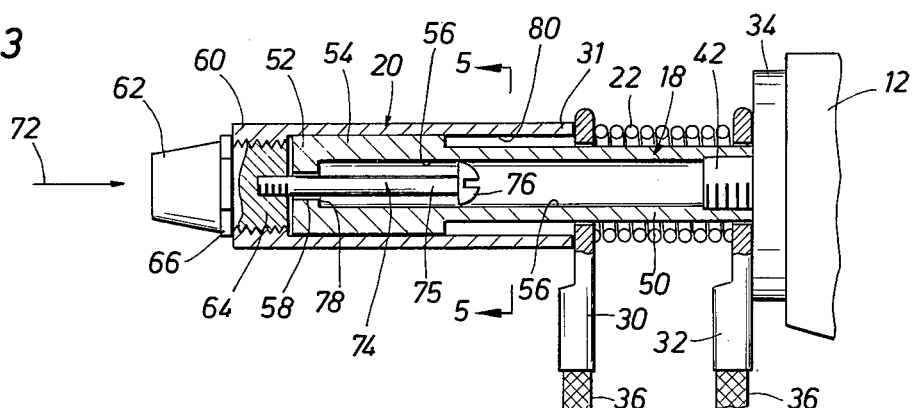
FIG. 3 is a partial longitudinal-sectional view of the apparatus of FIG. 2 in an engagement mode with the stud assembly.

With reference now to FIGS. 2 and 3, there may be seen a drive shaft 42 extending from the housing 12. This drive shaft 42 is driven by a conventional motor 112 (not shown in FIGS. 2 and 3 but schematically shown in FIG. 8) mounted within the housing 12 and powered through a cable 44 terminated with another electrical connector 46 (see FIG. 1).

The drive shaft 42 is threaded to the chuck 18 at a proximal end 48 of the chuck 18. This chuck 18 has a reduced diameter portion 50 which is circular in cross-section. At a distal end 52 of the chuck 18 there is an enlarged portion 54 having a generally rectangular cross-section (see FIGS. 4 and 5). The chuck has an enlarged diameter bore 56 along a portion of its length and a reduced diameter bore 58 at its distal end 52.

The collar 20, which is generally rectangular in cross-section, overlies the enlarged portion 54 of the chuck 18. The sleeve 20 can slide longitudinally over the enlarged portion 54 of the chuck 18.

As noted above, an engagement head 24 is disposed at a distal end 60 of the collar 20. This engagement head comprises a tapered or frusto-conical portion 62 and a threaded portion 64 cooperable with interior threading in the collar 20. An exterior hexagonal portion 66 and interior bore 67 may be fashioned to facilitate threading the head 24 to the collar 20.

As may be seen in FIG. 3, the collar 20 may be displaced towards the housing 12. This, of course, will compress the spring 22 between the lugs 30 and 32. The compression of the spring 22 and the engagement of an abutment surface 68 on the distal end 52 of the chuck and an abutment surface 70 of the threaded portion 64 of the engagement head 24 are cooperable to limit the extent of travel in the compression direction 72 (see FIG. 3).

As may be seen in FIG. 3, a bolt 74 having a shaft 75 is threaded into the threaded portion 64 of the engagement head 24. A head 76 of the bolt 74 limits the travel of the collar 20 in the expanded direction upon engagement with an abutment surface 78 within the chuck 18. It will, of course, be appreciated that the bolt head 76 travels along the interior bore 56 of the chuck 18.

It will be further appreciated that the first lug 30 is always in electrical contact with the conductive sleeve or collar regardless of the position of the sleeve 20 relative to the chuck 18. The head 76 of the bolt 74 facilitates smooth longitudinal movement of the sleeve 20 relative to the chuck 18 until the spring 22 is compressed to its limit or the abutment surfaces 68 and 70 come into contact. The combination of elements in the apparatus 10 provides that a relatively uniform force be imposed by the engagement head 24 when the engagement head is urged towards the stud assembly 26, by an operator gripping the apparatus at the pistol grip portion 14 of the housing 12.

Figures 4, 5:
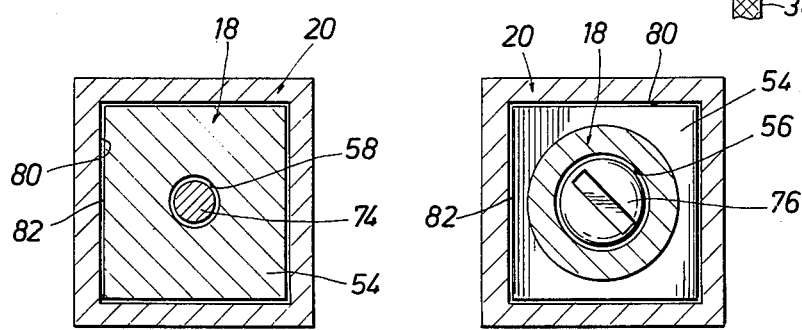
FIG. 4 is a transverse-sectional view taken through section lines 4—4 in FIG. 2.
FIG. 5 is a transverse-sectional view taken along section lines 5—5 in FIG. 3.

As may be seen in FIG. 4, the collar 20 and the enlarged portion 54 of the chuck 18 are in a sliding engagement. Conventional lubricants may be used to facilitate the bearing action between the interior face 80 of the sleeve 20 and the exterior face 82 of the enlarged portion 54 of the chuck. Similarly, a conventional lubricant may be utilized between the bolt 76 and the reduced diameter bore 58 in the chuck 18. It will, of course, be appreciated that as seen in FIG. 5 the diameter of the shaft 75 of the bolt 74 is less than the reduced diameter bore 58, and the head 76 of the bolt 74 is of a greater diameter than the reduced diameter bore 58 but a lesser diameter than the longitudinal bore 56 of the chuck.

The control module of the apparatus 10 may be described in connection with FIG. 8. AC voltage is applied from a conventional source, e.g., conventional 120 volt line, to a pair of terminals 86 and 88. Current is supplied through a normally closed contact 90 to a conventional relay coil 92. This relay coil 92 is thus normally energized when the apparatus 10 is connected to a power source but in a dormant condition. With the control relay coil 92 energized, a normally open contact 94 is closed and a normally closed contact 96 is open. In the dormant condition of the apparatus 10, an instant-action contact 98 is open so that no current may flow through a diode 100, a contactor relay coil 102 and filter capacitor 104 when voltage is applied to the terminals 86 and 88.

The contactor coil 102, through conventional means not shown, energizes a conventional arc welding generator (not shown) which provides an arc welding current to the terminal and engagement head 24 of the apparatus (see FIGS. 1 through 3).

When the trigger switch 16 is depressed, the time delay relay instant-action contact 98 is immediately closed. With this contact 98 now closed, current is able to flow to the diode 100, contactor relay coil 102, and capacitor 104, thus energizing the arc welding generator (not shown). After a predetermined time delay caused by time delay relay coil 106 being energized, the normally closed contact 90 opens. With this contact 90 now open, the relay coil 92 is deenergized causing the control relay contact 94 to open to remove current flow from the diode 100, contactor coil 102, capacitor 104 combination. As a result of the deenergization of relay coil 92, the control relay contact 96 closes, and current is supplied to the motor 112 of the apparatus 10.

Figure 6:
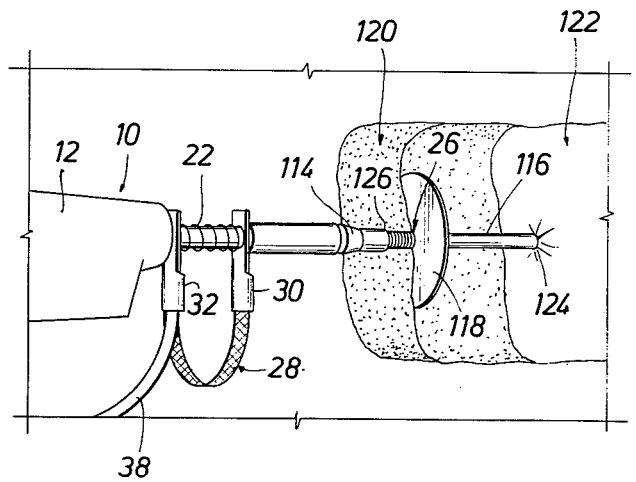
FIG. 6 is a pictorial representation of apparatus of the invention in the engagement mode with a stud assembly wherein an electric current is being transferred through the stud assembly to arc weld the stud assembly to an object.

With reference now to FIG. 6, there may be seen the apparatus 10 of the present invention with the engagement head 24 engaged with a movable portion 114 of the stud assembly 26. This stud assembly is comprised of a stud 116 to which is threaded the movable portion 114. This movable portion comprises a sleeve interference fit over a hexagonal nut. A circular retaining disc or washer 118 is shown comprising a portion of the stud assembly 26. This stud assembly may be fashioned in accordance with the teachings of U.S. Pat. No. 3,706,870 by the same inventors as the present invention and is of the type found in a PYRO-BLOC brand fiber insulation module 120 referred to above. A stationary metal wall 122 is shown as underlying the fibrous insulation material 120. It should be noted that the PYRO-BLOC fiber insulating material 120 is comprised of a laminate of heat resistant materials. Moreover, it will be appreciated that the fibrous insulation material 120 may be displaced by the stud 116 so as not to prevent the stud 116 from coming into contact with the wall 122 when a uniaxial force is applied to the stud 116 in the direction of the wall 122.

With the engagement head 24 in a position as shown in FIG. 6, an operator of the apparatus 10 of the present invention may impose a force tending to press the stud portion 116 of the stud assembly 24 toward the wall 122. The spring 22 regulates the amount of this force.

Figure 8:
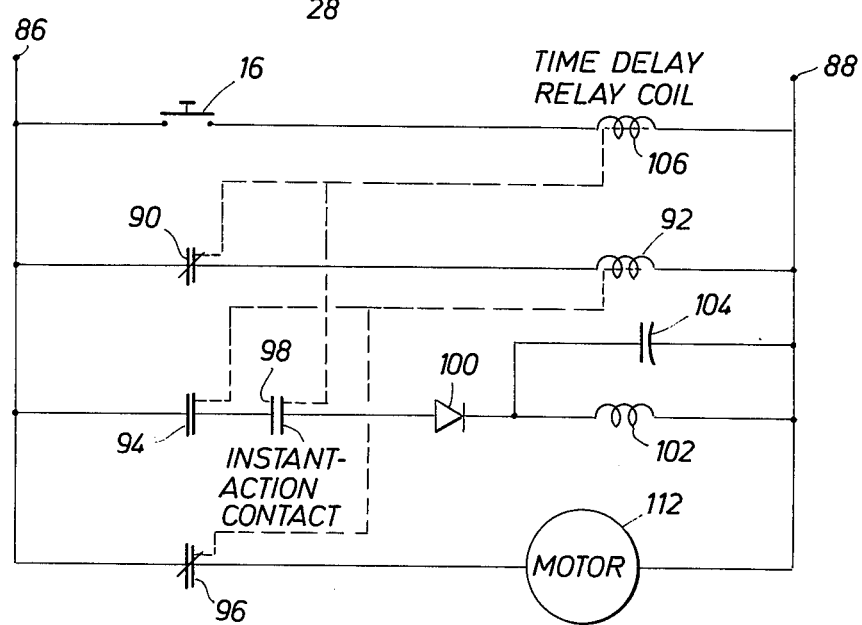
FIG. 8 is a schematic diagram of the control module for the apparatus of the present invention.

When it is desired to affix the stud assembly 26 to the wall 122, the trigger switch 16 of the apparatus 10 is depressed which activates the control module (FIG. 8). Electric current is supplied through the welding cable 38 to the engagement head 24. The wall 122 may be made one terminal of an electric arc welding process, and, with the engagement head 24 as a second terminal, an arc may be provided between the wall 122 and a distal end 124 of the stud portion 116 of the stud assembly 26. The duration of this arc is automatically controlled by the control module (FIG. 8) of the apparatus. The spring 122 provides the appropriate force on the stud assembly 26 to press the stud portion 116 into a molten pool formed by the heat of the arc.

As noted above, the distal end or tip 124 is preferably fashioned in accordance with the teachings of U.S. Pat. No. 3,706,870 by the same inventors as the present invention. The stud tip disclosed in the U.S. Pat. No. 3,706,870 provides an arrangement whereby a unidirectional force may be applied during the entire welding operation to a stud assembly in a direction towards a stationary object to which the stud will be welded. In a preferred embodiment of the present invention, the stud tip 124 is placed against the wall 122, and current is applied. Arc initiation and arc length are controlled by the particular geometry of the apparatus disclosed in the referenced patent. Whereas the arrangement disclosed in U.S. Pat. No. 3,706,870 is preferred, other such arrangements are contemplated and considered to be within the scope of the present invention.

Figure 7:
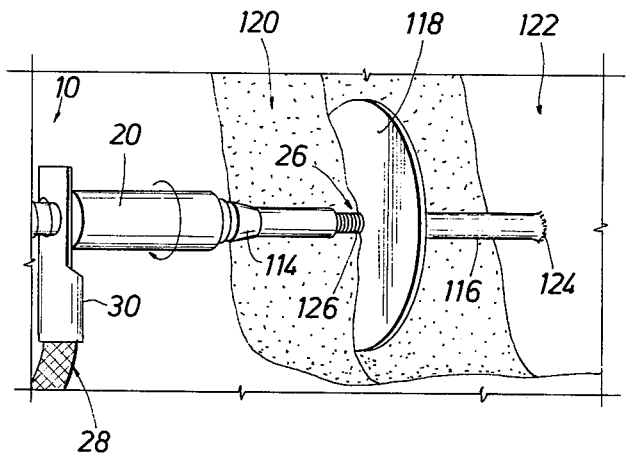
FIG. 7 is a pictorial representation of the apparatus of FIG. 6 wherein the apparatus has displaced a movable portion of the stud assembly shown in FIG. 6.

The control module (FIG. 8) automatically terminates the arc welding process and engages the motor 112 within the housing 12 to rotate the movable portion 114 of the stud assembly 26. As may be seen in FIGS. 6 and 7, the engagement head 24 drives the movable threaded portion 114 of the stud assembly 26 in the direction towards the wall 122. This movable portion 114 of the stud assembly 26 is operable to secure the insulating material 120 to the stud 112 and, hence, to the wall 122. The retaining disc 118, which significantly contributes to the fastening of the insulating material 120 to the wall 122 may be held in place by a bottom portion 126 of the movable threaded portion 114 of the stud assembly 26.

When the movable threaded portion 114 of the stud assembly 26 has been displaced in a direction towards the wall 122 to an extent where it either engages the retaining disc 118 or other resistance, the torque required to continue rotating the threaded portion 114 exceeds that able to be delivered by the engagement head 24. As a result, the engaging head 24 slips and can no longer drive the movable portion 114 since sufficient friction cannot be developed between the exterior surfaces of the engagement head and the interior of the mating surface of the movable portion of the stud assembly. The trigger 16 is then released, and the relay 106 resets. The apparatus 10 is now in a condition to affix another stud assembly 26 to the wall 122.

It will, of course, be appreciated that the electric current supplied to the engaging head 24 is not supplied during operation of the driving motor 112 in the particular application illustrated. However, it is not intended that the present invention be so limited, and it is contemplated that simultaneous rotation and current supply functions may take place.

After the stud assembly is welded to the wall 122, it may be desirable to remove the sleeve interference fit over a hexagonal nut which holds the washer in an appropriate position. A method of removing this sleeve is to insert a tool such as a pair of needle-nose pliers into the insulation material and withdraw the sleeve from over the hexagonal nut. An alternative embodiment of the present invention is operable to remove this sleeve portion after the termination of the welding and displacing functions.

Figure 9:
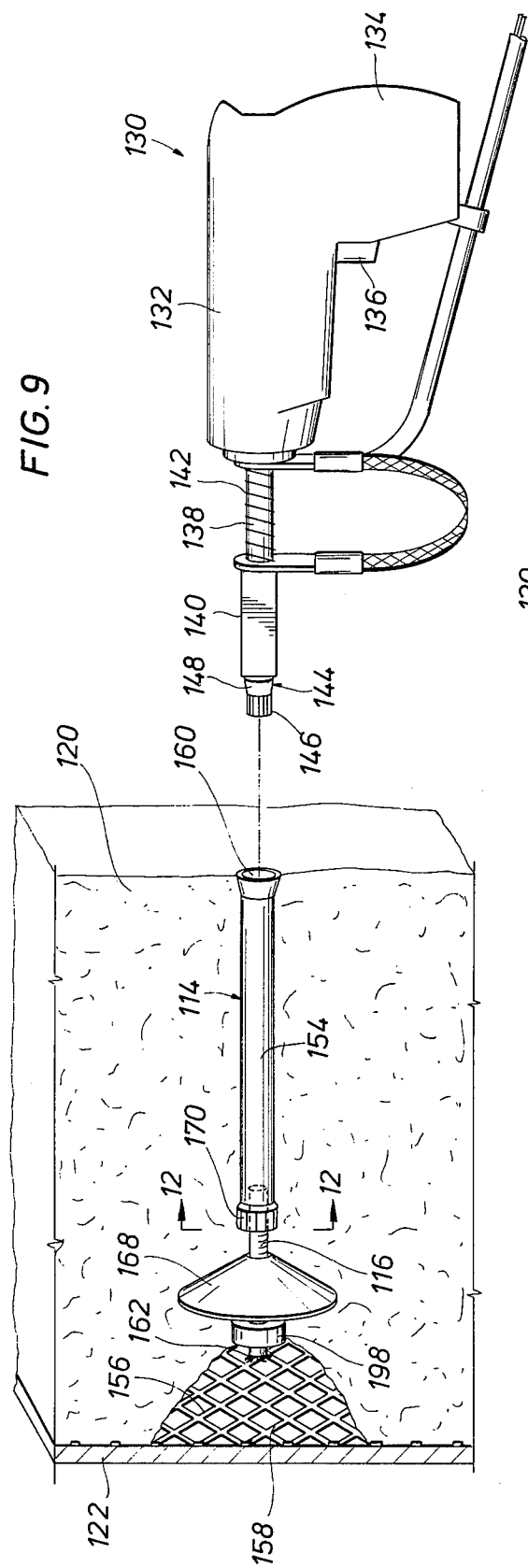
FIG. 9 pictorially depicts an alternative embodiment with a driving head having engagement ribs.
Figure 11:
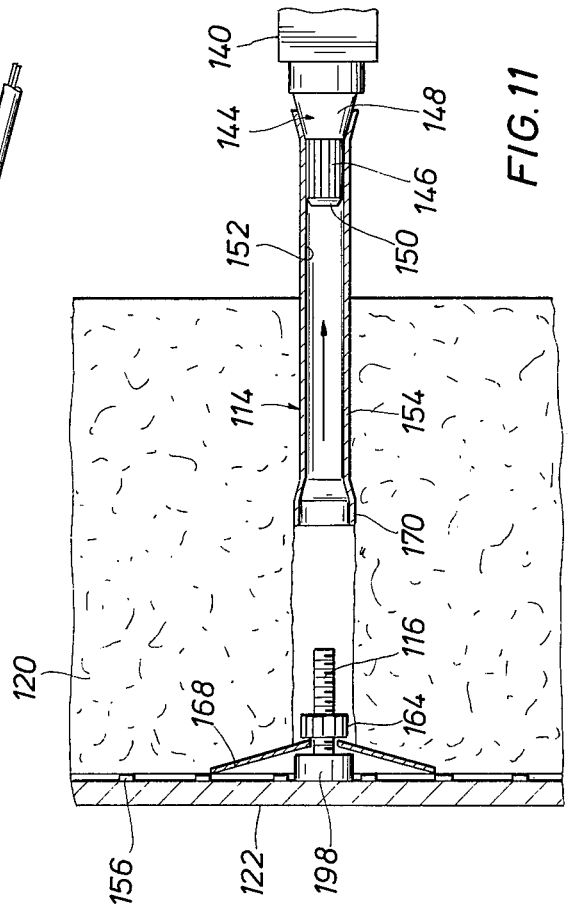
FIG. 11 is a partial longitudinal-sectional view of the driving head of FIG. 10 wherein a sleeve portion of the stud assembly has been overdriven by the apparatus to deform an end of the sleeve previously interference fit over a threaded member to uncouple the sleeve from the threaded member.
Figure 10:
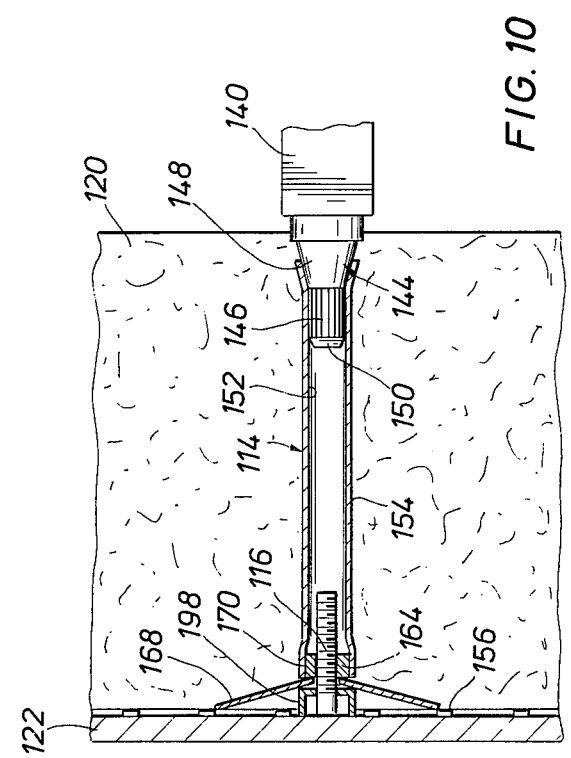
FIG. 10 is a partial longitudinal-sectional view of a driving head and arc welding terminal shown in FIG. 9 wherein the stud portion of a stud assembly has been welded to a stationary object and a threaded member of the stud assembly has been rotated by the apparatus.

As may be seen in FIGS. 9–11, an alternative embodiment 130 of a fastening apparatus according to the present invention is provided having a housing 132 with a pistol grip type handle 134 and a trigger switch 136. Extending from the housing 132 is a chuck 138 which is operable to support a sleeve or collar 140. The collar 140 is longitudinally movably mounted on the chuck 138 and is biased in a direction generally away from the housing 132 by means of a spring 142. The collar 140 carries a tapered electrical terminal 144 comprising ribs or fluting along an extension 146 thereof.

The particular details of the engagement head assembly are substantially similar to those described in connection with the embodiment depicted in FIGS. 1–7 and for the sake of brevity will not be repeated here. However, it will be appreciated that the operation of the apparatus differs significantly from that of the apparatus depicted in FIGS. 1–7.

As may be seen in FIGS. 9–11, the welding head comprises a first frustro-conical portion 148, a second frustro-conical portion 146 and a third frustro-conical portion 150. The first frustro-conical portion 148 is similar to the frustro-conical engagement head disclosed in connection with the embodiments depicted in FIGS. 1–7. The second frustro-conical portion 146 is only slightly tapered and, as will be appreciated, this second frustro-conical portion may in fact be generally cylindrical in geometry. This second frustro-conical portion 146 has longitudinally disposed ribs around the circumference thereof to provide a fluted exterior surface operable to grippingly engage an interior surface 152 of the sleeve portion 154 of the movable threaded member 114 of the stud assembly. The sleeve may be fabricated from aluminum or other such soft metal in which case the ribs around the exterior of the second section 146 will cut into the metal slightly and become locked thereto. It will, or course, be appreciated that if a more frustro-conical geometry is chosen for the second section 146, a greater "wedging" affect will occur. However, the ribs may be sufficiently sharp and fashioned from a sufficiently hard material that a cylindrical geometry may be chosen with ribs which extend a distance which exceeds the inside diameter of the sleeve 154, thereby assuring a tight fit. The third portion 150 of the welding terminal or engagement head is tapered to facilitate entry into the sleeve portion.

In operation, the stud assembly is preassembled and inserted into a block of insulating material 120 having, say, an expanded metal backing 156. The stud portion 116 of the stud assembly is first positioned so as to extend through the "diamonds" 158 in the expanded metal backing 156. It will, of course, be appreciated that the present invention is not intended to be limited by the particular choice of such backing material.

As shown in FIG. 9, the fastening apparatus 130, and in particular the terminal 144, is brought into alignment with the mouth 160 of the sleeve portion 154, and an operator may impose a force tending to press the stud assembly toward the relatively fixed object to which the stud will be welded, e.g., the wall 122 of a furnace. The spring 142 regulates the amount of this force.

As the welding terminal 144 enters the mouth 160 of the sleeve portion 154, the ribs engage the interior wall 152 of the sleeve and the welding terminal 144 and the sleeve 154 become frictionally coupled.

The trigger switch 136 of the apparatus is depressed which activates a control module (FIG. 8) which supplies electric current through the welding cable 28 to the engagement head or terminal 144. The wall 122 is made one terminal of an electric arc welding process, and, with the engagement head 144 as a second terminal, an arc may be produced between the wall 122 and a distal end 162 of the stud portion of the stud assembly. The duration of this arc (approximately one second) is automatically controlled by a control module (FIG. 8) of the apparatus. The spring 142 provides the appropriate force on the stud assembly to press the stud portion 116 into a molten pool formed by the heat of the arc.

The arc welding process may be automatically terminated by the control module (FIG. 8), and the motor within the housing 132 of the apparatus may be energized to rotate the welding head 144. Rotation of the welding head causes the sleeve 154 to rotate. The sleeve, as noted above, is interference fit over a six-sided nut 164. It may be preferable to utilize a twelve-sided nut as will hereinafter be more fully explained. Therefore, rotation of the welding head causes the nut 164 to rotate on the now welded stud 116. The movement of the nut along the stud urges a washer 168 against the expanded metal backing 156. As may be seen in the drawings, this washer 168 is preferably frustro-conical in order to more satisfactorily secure the insulation module to, say, a wall of a furnace. FIG. 10 depicts the manner in which the apparatus functions to tighten the threaded portion 114 of the stud assembly.

As may be seen in FIG. 11, after the sleeve 154 has been rotated an amount sufficient to move the nut 164 to a predetermined position along the stud 116, the nut will offer some torque resistance to the attachment apparatus. Because the frictional fit between the ribs of the portion 146 of the welding terminal 144 and the sleeve 154 offers extraordinarily high friction, generally no slippage will occur between these numbers. However, the sleeve is fabricated from a relatively soft material, e.g., aluminum, as pointed out above, and the diameter of the portion 170 of the sleeve interference fit over the nut 164 may be reemed or swedged as a result of the nut's ceasing rotation while the sleeve 154 continues to rotate. This "overdriving" of the sleeve causes the end 170 of the sleeve to enlarge slightly with the result that when the fastening apparatus 130 is withdrawn from the insulation block 120, the sleeve 154 is removed with the welding head thereby eliminating the necessity of manually removing the sleeve from the insulation block. The sleeve may be relatively easily removed from the welding terminal by manually pulling longitudinally on the sleeve.

By fabricating the sleeve from a relatively soft material, torque control or torque limiting may be achieved in the use of this apparatus. As may be seen in FIG. 13, a six-sided nut 164 may intersect larger chords in the end 170 of the tubular or sleeve member 154 and thereby require greater torque to overdrive the tubular sleeve than in the case of a 12-sided nut 164' as shown in FIG. 12, which intersects smaller chords and is hence more round. That is to say, the 12-sided nut 164' demonstrates less resistance to overdriving the sleeve than the six-sided nut 164 and it may in, some cases, be more desirable to utilize the 12-sided nut.

In FIGS. 14–16, there is shown an alternative embodiment of the apparatus of the present invention. An elongate, cylindrical welding terminal 172 may be substituted for the frustro-conical sections 146, 148 and 150 in order to achieve greater utility in some applications. This elongate cylindrical member 172 is operable as a welding terminal and driving member or wrench, and is attached at a first end 174 to the collar 140 of the apparatus. The longitudinal member 172 may be, say, threaded or otherwise conventionally attached to the collar 140. Inasmuch as the longitudinal member will function as a welding terminal, it need be fabricated from an electrically conductive material such as steel. The member 172 is generally cylindrical with a cylindrical inner wall 178 adapted to receive a guide member 176 associated with a stud assembly 180. Another end 182 of the elongate terminal has interior faces 183 arranged to interlock with a six-sided nut 184 and has a taper 185 machined on an outer edge in order to displace insulation material 120 when the sleeve or terminal 172 in advanced towards the stud assembly 180. The nut 184 comprises part of the preassembled stud assembly 180, and has at one end 186 a bearing surface 188 which is attached to or integrally formed with the nut and at another end 190 has milled edges 192. This milled end 190 is arranged to receive the engaging end 182 of the terminal 172 as the terminal is advanced towards the nut 184 as the terminal slides along the guide member 176.

The guide member 176 may be fabricated from soft wood or paper and lies against an end 194 of the stud portion 116 of the stud assembly 180. A sharpened end 181 is provided on the guide member to facilitate cooperation with the terminal 172. The guide 176 is held in place by the nut 184 on the assembled but not yet tightened stud assembly 180. Initially, the unit 184 is about half threaded onto the stud 116 and in a position to receive the guide member 176 which is self-threaded as shown at 177 into the nut 184. It will, of course, be appreciated that the guide member has as its diameter a dimension slightly greater than the stud 116 in order that the guide member may be firmly held by the nut 184. The assembly of the guide member 176 to the stud assembly 180 occurs during assembly of the insulation module.

As may be seen in FIG. 15, when the nut 184 is threaded toward the welded end 162 of the stud 116, the nut 184 unthreads itself from the guide member 176 whose axial movement is limited by the stud 116. As a result, the guide will no longer be supported by the stud assembly and will fall free into the cylindrical portion 178 of the welding terminal 172. Therefore, as the welding terminal is withdrawn, the guide member is carried away thereby eliminating the necessity for a separate step for removing the guide member from the insulation module.

If it is desired to achieve torque control in the use of this embodiment of the apparatus, the nut 184 may be fabricated from a relatively soft material such that when the nut has been threaded down onto the stud 116 to its limit as shown in FIG. 15, the faces 183 of terminal 176 would essentially shear the edges of the nut 184, and the welding terminal would rotate freely without further drive being imposed on the nut. Travel of the nut towards the weld is limited by an arc shield 198 and washer 168 which serve to urge the expanded metal 156 against the wall 122 of the furnace to securely fasten the insulation module thereto.

It will be appreciated that certain advantages may be realized in the practice of the present invention. For example, the apparatus of the present invention facilitates a single manual operation stud assembly fastening process. Certain operations, for example, the insulation of furnaces, may take place at a fraction of the time previously required and with substantial savings in furnace downtime and labor costs. The present invention has the further advantage that its method may be practiced without special skill or experience, particularly insofar as regards axial forces and torque imposed on the stud assembly during the attachment process.

Whereas a preferred embodiment of the method and apparatus of the present invention are shown and described herein, it is to be understood that the invention is not intended to be limited thereby but rather to encompass other embodiments falling within the scope and spirit of the appended claims.

What is claimed is:

1. Apparatus for attaching to a relatively stationary object a stud assembly having a relatively fixed portion and a movable portion movable between a first position and a second position, said apparatus comprising:
welding terminal means for conducting an electrical current through a stud assembly having a relatively fixed portion and a movable portion movable between a first and a second position, said welding terminal means being operable to weld the relatively fixed portion of the stud assembly to a stationary object;

engagement means defined by said welding terminal means for engaging the movable portion of the stud assembly;

displacement means for displacing said engagement means when said engagement means engages the movable portion of the stud assembly to move the movable portion of the stud assembly from the first position to the second position;

torque control means for controlling a torque imposed on the stud assembly by said engagement means when said displacement means displaces said engagement means; and force control means for controlling a normal force imposed on the stud assembly by said engagement means when said engagement means engages the movable portion of the stud assembly.

2. The apparatus of claim 1 wherein said displacement means comprises rotation means for rotating the movable portion of the stud assembly.

3. The apparatus of claim 1 wherein said engagement means is terminated by a frustro-conical engagement head.

4. The apparatus of claim 3 wherein said torque control means comprises said frustro-conical engagement head having an exterior surface operable to frictionally engage the movable portion of the stud assembly to provide a torque sufficient to move the movable portion of the stud assembly from the first position to the second position and slippingly engage the movable portion of the stud assembly when a predetermined torque is achieved.

5. The apparatus of claim 1 wherein said force control means comprises spring means for urging said engagement means towards the stud assembly with a predetermined force.

6. Apparatus for attaching to a relatively stationary object a stud assembly having a relatively fixed portion and a movable portion movable between a first position and a second position, said apparatus comprising:

handle means for manually gripping said apparatus;

stud assembly engaging means supportable by said handle means for engaging at least a movable portion of a stud assembly having a relatively fixed portion and a movable portion movable between a first position and a second position;

arc welding means having a terminal defined by said stud assembly engaging means for conducting an electrical current through the stud assembly to arc weld the relatively fixed portion of the stud assembly to a stationary object;

displacement means for displacing said engaging means to move the movable portion of the stud assembly from the first position to the second position;

torque control means for controlling a torque imposed by said displacement means when said displacement means displaces the movable portion of the stud assembly;

force control means for controlling a normal force imposed by said terminal when the electrical current is conducted through the stud assembly;

first switch means for electrically energizing said arc welding means;

control means for deenergizing said arc welding means after a predetermined time period elapses; and second switch means, operable in response to a deenergizing of said arc welding means upon a lapsing of said time period, for electrically energizing said displacement means.

7. The apparatus of claim 6 wherein said displacement means comprises rotation means for rotating the movable portion of the stud assembly.

8. The apparatus of claim 7 wherein said engagement means is terminated by a frustro-conical engagement head.

9. The apparatus of claim 8 wherein said torque control means comprises said frustro-conical engagement head having an exterior surface operable to frictionally engage the movable portion of the stud assembly to provide a torque sufficient to move the movable portion of the stud assembly from the first position to the second position and slippingly engage the movable portion of the stud assembly when a predetermined torque is achieved.

10. The apparatus of claim 6 wherein said force control means comprises spring means for urging said engagement means towards the stud assembly with a predetermined force.

11. Apparatus for attaching to a relatively stationary object a stud assembly having a relatively fixed portion with external threads and a movable portion having internal threads and movable between a first position and a second position, said apparatus comprising:

a welding terminal for conducting electrical current to a stud assembly having a relatively fixed portion with external threads and a movable portion having internal threads and movable between a first position and a second position, said welding terminal being operable to conduct an electrical current sufficient to weld the relatively fixed portion of the stud assembly to a stationary object; and rotation means for rotating said welding terminal to thread the movable portion of the stud assembly onto the relatively fixed portion of the stud assembly;

said welding terminal having an external surface operable to frictionally engage the movable portion of the stud assembly to provide a torque sufficient to move the movable portion of the stud assembly from the first position to the second position and slippingly engage the movable portion of the stud assembly when a predetermined torque is achieved when said rotation means rotates said welding terminal.

12. The apparatus of claim 11 wherein said welding terminal comprises a frustro-conical engagement head.

13. The apparatus of claim 12 and further comprising force control means for controlling a normal force imposed on the stud assembly by said welding terminal when said welding terminal engages the movable portion of the stud assembly.

14. The apparatus of claim 13 wherein said force control means comprises spring means for urging said engagement means towards the stud assembly with a predetermined force.

15. The apparatus of claim 12 and further comprising:

first switch means for electrically energizing said welding terminal;

control means for deenergizing said welding terminal after a predetermined time period elapses; and second switch means, operable in response to a deenergizing of said welding terminal upon a lapsing of said time period, for supplying an energizing force to said rotation means.

16. Apparatus for attaching to a relatively stationary object a stud assembly having a stud, a threaded member threaded to the stud and an elongate guide axially disposed adjacent the stud, said apparatus comprising:
a welding terminal for conducting an electrical current through a stud assembly, the stud assembly having a stud, a threaded member threaded to the stud and an elongate guide axially disposed adjacent the stud, to weld the stud to a relatively fixed object, said welding terminal comprising;
a first interior wall defining a guide-receiving zone interior said welding terminal to receive the guide to direct said welding terminal to the threaded member,
an engagement head defined by a second interior wall for engaging an exterior surface of the threaded member when said welding terminal is guided to the threaded member, and
rotation means for rotating said welding terminal to thread the threaded member onto the stud.

17. The apparatus of claim 16 wherein said welding terminal comprises means operable to carry away the elongate guide after the threaded member is threaded to the stud and said welding terminal is removed from the stud assembly.

18. The apparatus of claim 16 wherein said welding terminal includes a tapered head.

19. The apparatus of claim 16 wherein said engagement head comprises means for engaging the threaded member.

20. The apparatus of claim 16 and further comprising:
current timing means for controlling a duration of electrical current deliverable to said welding terminal; and
rotation controlling means for controlling a duration of rotation of said rotation means.

21. The apparatus of claim 16 and further comprising force control means for controlling a normal force imposed by said welding terminal when said welding terminal is brought into contact with the stud assembly.

22. The apparatus of claim 21 wherein said force control means comprises spring means for urging said welding terminal toward the stud assembly with a predetermined force.

23. A method for attaching to a relatively fixed object an electrically conductive stud assembly having a stud, a threaded member threaded to the stud and a sleeve interference fit over the threaded member, said method comprising the steps of:
engaging the sleeve of the stud assembly with an electrically conductive welding terminal operable to grippingly engage the sleeve;
directing an electric current through the welding terminal and stud assembly to weld the stud of the stud assembly to the relatively stationary object;
terminating the flow of electric current to the welding terminal;
rotating the welding terminal to thread the threaded member to the now welded stud; and
withdrawing the welding terminal from the stud assembly with the sleeve grippingly attached to the welding terminal.

24. The method of claim 23 wherein a duration of said directing step is automatically controlled.

25. The method of claim 24 wherein the terminating and rotating steps are automatically sequenced.

26. A method of attaching to a relatively stationary object a stud assembly having a stud, a threaded member threaded to the stud and an elongate guide axially disposed adjacent the stud, said method comprising the steps of:
coaxially aligning the elongate guide with an interior of a generally cylindrically rotatable elongate welding terminal;
displacing the welding terminal axially towards the threaded member;
directing an electric current through the welding terminal and stud assembly to weld the stud to the relatively stationary object;
terminating the flow of electric current to the welding terminal;
rotating the welding terminal to thread the threaded member onto the now welded stud; and
withdrawing the welding terminal which is operable to carry away the elongate guide.

27. The method of claim 26 wherein a duration of said directing step is automatically controlled.

28. The method of claim 26 wherein the terminating and rotating steps are automatically sequenced.

* * * * *